(12) United States Patent
Fabick, Jr.

(10) Patent No.: US 6,539,630 B1
(45) Date of Patent: Apr. 1, 2003

(54) METHOD OF ADHESION OF IN SITU VEHICLE BED LINER

(75) Inventor: Joseph G. Fabick, Jr., Madison, WI (US)

(73) Assignee: Fabick, Inc., Madison, WI (US)

( * ) Notice: Subject to any disclaimer, the term of this patent is extended or adjusted under 35 U.S.C. 154(b) by 0 days.

(21) Appl. No.: 09/453,186

(22) Filed: Dec. 2, 1999

(51) Int. Cl.$^7$ ................................................ B21D 53/88
(52) U.S. Cl. ........................ 29/897.2; 29/458; 29/527.2
(58) Field of Search ................................ 29/458, 527.2, 29/897.2; 427/327, 388.1–388.5, 409; 296/39.1, 39.2; 264/254, 269, 274, 135

(56) References Cited

U.S. PATENT DOCUMENTS

| | | | |
|---|---|---|---|
| 3,578,375 A | * | 5/1971 | Finefrock .................. 296/39.2 |
| 3,762,677 A | | 10/1973 | Adams |
| 3,815,200 A | | 6/1974 | Adams |
| 3,844,030 A | | 10/1974 | Wilkinson |
| 4,333,678 A | * | 6/1982 | Munoz et al. ............. 296/39.2 |
| 4,695,618 A | | 9/1987 | Mowrer |
| 4,751,129 A | | 6/1988 | Ramalingam et al. |
| 4,913,873 A | | 4/1990 | Robbins, III |
| 5,059,634 A | | 10/1991 | Smith |
| 5,084,521 A | | 1/1992 | White |
| 5,124,426 A | | 6/1992 | Primeaux, II et al. |
| 5,418,260 A | | 5/1995 | Smith |
| 5,422,414 A | | 6/1995 | Smith |
| 5,654,085 A | | 8/1997 | Markusch et al. |
| 5,665,269 A | | 9/1997 | Hart |
| 5,814,398 A | | 9/1998 | Kronz et al. |
| 5,925,466 A | * | 7/1999 | Burton .................... 428/423.1 |
| 5,927,788 A | | 7/1999 | Long |
| 5,962,618 A | | 10/1999 | Promeaux, II et al. |
| 5,985,986 A | | 11/1999 | Kubitza et al. |
| 6,000,741 A | * | 12/1999 | Reynolds et al. .......... 296/39.2 |
| 6,001,924 A | | 12/1999 | Döbert et al. |
| 6,126,999 A | * | 10/2000 | Tomasino et al. ........ 427/388.4 |

* cited by examiner

Primary Examiner—Gregory M. Vidovich
Assistant Examiner—Jermie E. Cozart
(74) Attorney, Agent, or Firm—Godfrey & Kahn, S.C.

(57) ABSTRACT

Vehicle bed liners are widely utilized to cover the beds of utility vehicles and protect the bed from damage. Bed liners are conventionally secured by nails or screws which can easily vibrate loose and expose the vehicle bed to dirt and moisture which facilitates rust and corrosion. The present invention provides a method of securing the bed liner to the vehicle bed without the gaps and seems formed by conventional coupling methods.

10 Claims, 3 Drawing Sheets

METHOD OF ADHESION OF IN SITU VEHICLE BED LINER

FIELD OF THE INVENTION

This invention relates generally to the field of vehicle bed liners and processes for adhering same.

BACKGROUND OF THE INVENTION

Vehicle bed liners have been widely utilized in the past to cover the beds of vehicles such as dump trucks, pickup trucks, and other utility vehicles. Bed liners both protect the vehicle bed against scratches and dents and create an impact-absorbing barrier. Vehicle bed liners have been created from molded polymer composition.

Molded truck bed liners are generally comprised of a variety of materials such as polyethylene, polypropylene, or polyvinylchloride. These liners are generally vacuum-formed to fit a particular configuration of a vehicle bed and then stored in inventory. Once a molded liner is purchased, it is dropped into a vehicle bed and may be attached to a bed to act as a protective liner. The disadvantages of molded liners are numerous. Molded drop-in-place liners may require drilling or bolting to the vehicle body which exposes the vehicle bed to rust and corrosion. Further, molded vehicle bed liners may warp, crack, tear, or vibrate loose. Additionally, no matter how closely the bed liner models that of the vehicle to be lined, the molded liner will leave gaps between the liner and the vehicle bed. The gaps may become filled with dirt, moisture, or other materials that create the environment for accelerated corrosion of the vehicle bed beneath the liner. Also, worn out portions of molded liners cannot be replaced or repaired. Thus, the entire molded liner must be replaced after a portion of the liner is worn through, regardless of the condition of the remainder of the liner.

Furthermore, bed liners are typically attached using fasteners such as screws or clips to secure the molding directly to the vehicle surface. Such fasteners are generally exposed to the cargo surface and as a result are subject to damage and corrosion. Damaged fasteners cause the bed liner to shift from its proper position allowing for seems for dirt and moisture deposits.

There has been an attempt to address these concerns by spraying the vehicle bed with a sprayable epoxide polymer composition. However, several disadvantages also exist for this type of liner. First, because the epoxide is a slow-drying polymer, it flows down the sides of the vehicle bed prior to hardening. This has caused problems in the attempt to create a contiguous bed liner on the sides of the vehicle. Also, because epoxy has a slow drying time, its gel and cure times are dependent on ambient temperatures, which can add hours to the liner's finish time. Further, epoxies tend to be more brittle than other polymers (i.e., polyurethanes, polyethylines, polypropylenes) resulting in lower impact strengths. Additionally, epoxies cannot resist the 350° F. temperatures used in hauling asphalt. Other problems result from the method in which the epoxide is applied to the vehicle bed. The epoxide is typically sprayed onto the vehicle bed, incorporating microscopic air bubbles into the epoxide composition. This results in a weaker liner more susceptible to damage by abrasion, impact and normal surface wear. The weaker, less dense liner is usually acceptable for the sides of the vehicle which do not see heavy wear, but the vehicle floor requires a tougher, denser, more abrasion and heat-resistant liner. Also, sprayable bed liners have the propensity to dislocate from the vehicle bed resulting in many of the same difficulties produced by molded bed liners.

Despite advances in technology, vehicle bed liners are still less impact and abrasion resistant. Additionally, it remains difficult to produce a contiguous bed liner of a consistent thickness. Therefore, there is an existing need for a vehicle bed liner that is durable enough to withstand the demands of cargo transport while protecting the vehicle bed itself. There is also an existing need for a method of adequately securing the bed liner to the vehicle bed in such a manner that the bed liner is firmly secured and where the securing means is not subject to premature obsolescence and corrosion.

SUMMARY OF THE INVENTION

A method of adhesion, of an in situ vehicle bed liner, in accordance with the present invention comprises a method providing increased adhesion of a pour in place bed liner by utilizing a rust barrier primer (e.g., a quick set polyapoxyamide) and a mechanical means for adhering the bed liner to the bed.

The vehicle bed liner adhesion method according to the present invention comprises applying a primer to the vehicle bed to serve as a rust barrier. In one exemplary embodiment of the present invention, the bed liner is mechanically attached to the bed by anchors. The anchors are welded to the vehicle bed such that there is a rough texture for the pour in liner to adhere to. Most preferably, the anchors are strips made of a metal alloy. Additionally, when welding the metal strips the strips are twisted and arched so that at least the two edges of each metal strip touches the vehicle bed to form what is called a helical weld. Only one of the ends of the metal strip is welded to the vehicle bed and the other end is tacked to the vehicle bed. The metal strips are staggered. The pour in liner can flow through and around the spaces provided by the helical welding procedure to provide a reliable and snug fit between the bed and the bed liner.

It is one objective of the present invention to provide a suitable vehicle bed surface without sand blasting. To this end, a primer is provided that also serves as a rust barrier, such as a polyapoxyamide. By priming the surface, a rust barrier is provided that prevents the premature obsolescence of the vehicle bed and/or bed liner. The edges are important to insure adhesion so it is an objective of the present invention to provide enhanced adhesion by using an ugly weld along the edge of the vehicle bed.

It is a further object of the present invention to provide a vehicle bed liner adhesion method that affords excellent adhesive strength. In the furtherance of this and other objectives, a mechanical means of adhesion is provided. In a preferred embodiment of the present invention, strips, preferably made of a metal alloy, are provided which are welded to the floor and sides of the vehicle bed. It is preferable that the strips have holes through and around which the liquid polymer bed liner may flow. The metal strips are welded to the vehicle bed and sidewalls in predetermined patterns to enhance the ability of the liquid polymer bed liner to adhere to the metal strips and the vehicle bed itself. In a preferred embodiment in accordance with the present invention, the strip is longitudinally welded, to the vehicle bed, at alternating locations along the sides of the strip. The alternating sides of the strip that are not welded are raised such that the metal strip forms a helix. The helix orientation provides an optimal groove for the liquid polymer bed liner to flow through. Additionally, the holes in the strip allow for additional anchoring of the bed liner.

Additional reinforcement may be provided by smaller strips that will be welded in the grooves between the ribs of the vehicle bed. These smaller strips will be welded in a predetermined arrangement to serve as additional anchors for the bed liner. A preferred embodiment comprises upside down "V" shaped strips welded to the floor of the vehicle bed. In a preferred embodiment in accordance with the present invention, an additional strip, of metal or polymeric material, is passed through a hole drilled through the vehicle bed liner and the vehicle bed. The strip is then bolted at both the end exposed on the bed liner side and the end exposed underneath the vehicle bed floor for an added seal between the bed liner and the vehicle bed.

It is yet another object of the present invention to provide a tapered rear edge of the bed liner. To this end, a retainer strip is provided that prevents loss of the applied polymer from the vehicle bed during application of the liquid polymer and allows for production of a tapered liner floor and molded sides.

Still another objective of the present invention is to provide a quick curing bed liner that may be poured in place. In the furtherance of this and other objectives, a liquid polymer system is provided that reaches its gel point almost immediately after mixing. This allows the polymer to be applied to vertical surfaces of the vehicle bed without significant amounts of sagging or running of the polymer composition that would impede smooth formation of the liner. The liquid polymer is poured in place and the gel point of the polymer is reached shortly after contact of the polymeric material with the vehicle bed.

Further objects, features and advantages of the invention will be apparent from the following detailed description taken in conjunction with the accompanying drawings.

DETAILED DESCRIPTION OF THE INVENTION

Figure 1:
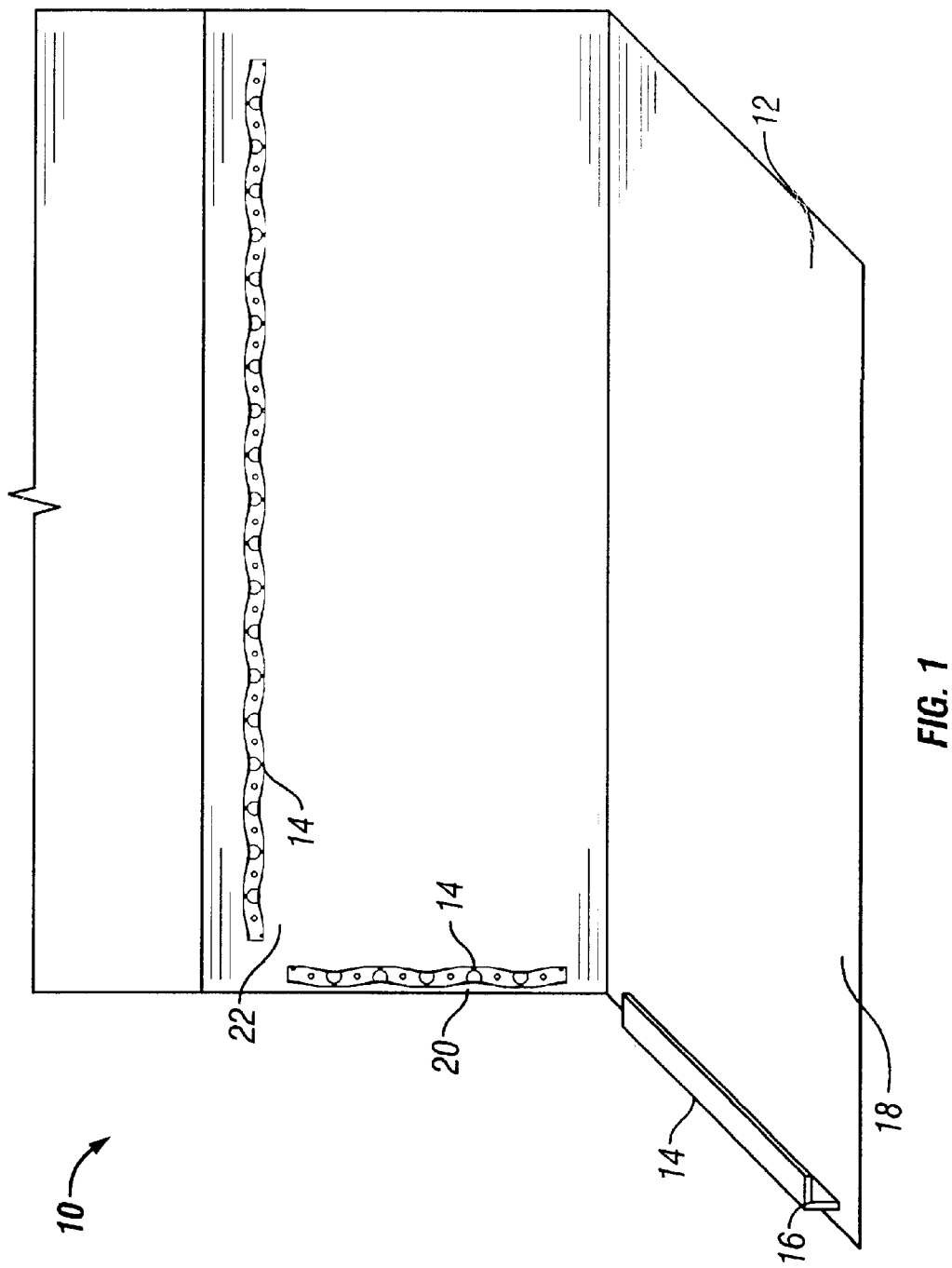
FIG. 1 is a partial sectional view of a vehicle bed box including the floor, a single side and retaining strips on each.
Figure 2:
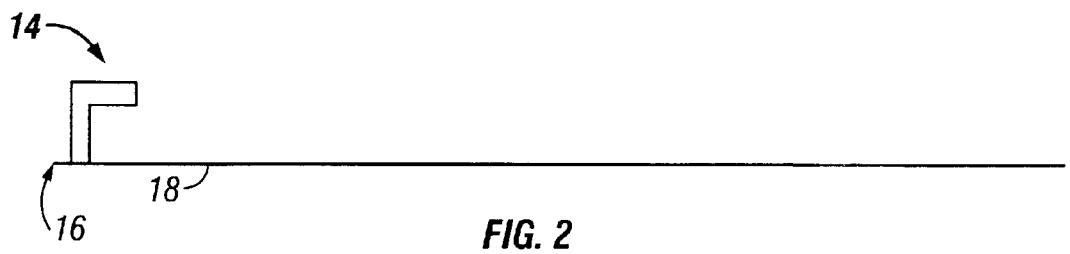
FIG. 2 is a side perspective sectional view of the vehicle bed floor and a retaining strip in close proximity thereto.

The vehicle bed liner adhesion method according to the present invention comprises applying a primer to the vehicle bed to serve as a rust barrier. In one exemplary embodiment of the present invention, the bed liner is mechanically attached to the bed by bolting the bed liner to the vehicle bed. The bed liner is also attached by strips which are welded to the vehicle bed such that there is a rough texture for the pour in liner to adhere to. Additionally, when welding the metal strips the strips are twisted and arched so that only the two ends of each metal strip touches the vehicle bed to form what is called a helical weld. Only one of the ends of the metal strip is welded to the vehicle bed and the other end is tacked to the vehicle bed. The metal strips are staggered. The pour in liner can flow through and around the spaces provided by the helical welding procedure to provide a reliable and snug fit between the bed and the bed liner.

The following terms are used in this application:

Gelpoint: The onset of gelation such that the polymer undergoes a sudden increase in viscosity and undergoes an almost instantaneous change from a liquid to a gel.

Almost immediately: The period of time, typically about 3 to 60 seconds, which is insufficient to allow significant flowing or sagging of the polymer composition on vertical or highly inclined surfaces prior to reaching the gel point.

A polyurethane polymer: Comprised of: (a) an isocyanate component, the isocyanate component comprising: (i) 70–100 parts by weight methylene-4,4'-diphenyl diisocyanate (MDI); and (ii) 0–30 parts by weight of a component selected from the group consisting of polyol and aminic polyol, with the excess in isocyanate groups ranging from 5% to 32.5%; (b) a polyol component, the polyol component comprising: (i) 20–100 parts by weight of a polyether polyol component of functionality of 2 to 4 and an average molecular weight of 400–6,000; (ii) 0–60 parts by weight fatty acid saturated polyester; (iii) 0–60 parts by weight aminic polyol; (iv) 0–5 parts by weight of an organometallic urethane forming catalyst; (v) 0–5 parts by weight of an amine urethane forming catalyst; and (vi) 0–40 parts by weight of an amine additive compound selected from the group consisting of triethanol amine and a triethanol amine-polyalkylene oxide reaction product.

Two component urea polymer: Comprised of: (a) an isocyanate component, the isocyanate component comprising: (i) 70–100 parts by weight methylene-4,4'-diphenyl diisocyanate (MDI); and (b) an aminic component, the aminic component comprising: (i) at least one amine compound, selected from the group consisting of 60–100 parts by weight aromatic diamine, 60–100 parts by weight aliphatic amine, and 60–100 parts by weight any combination thereof; and (ii) 0–40 parts by weight of an amine additive compound selected from the group consisting of triethanol amine and a triethanol amine-polyalkylene oxide reaction product.

Polyurethane/polyurea hybrid polymer: Comprised of: (a) an isocyanate component, the isocyanate component comprising: (i) 70–100 parts by weight methylene-4,4'-diphenyl diisocyanate; and (ii) 0–30 parts by weight of a component selected from the group consisting of polyol and aminic polyol, with the excess in isocyanate groups ranging from 5% to 32.5%; (b) a polyol/amine component, the polyol/amine component comprising: (i) 1–99 parts by weight of a polyether polyol component of functionality of 2 to 4 and an average molecular weight of 400–6,000; (ii) 0–60 parts by weight fatty acid saturated polyester; (iii) at least one amine component, selected from the group consisting of 1–99 parts by weight aromatic diamine, 1–99 parts by weight aliphatic amine, and 1–99 parts by weight any combination thereof; (iv) 0–60 parts by weight aminic polyol; (v) 0–5 parts by weight of an organometallic urethane forming catalyst; (vi) 0–5 parts by weight of an amine urethane forming catalyst; and (vii) 0–40 parts by weight of an amine additive compound selected from the group consisting of triethanol amine and a triethanol amine-polyalkylene oxide reaction product. The ratio of parts by weight of (a) components to parts by weight of (b) components in all of the forgoing formulas should give an index of from about 102 to 110, preferably 105. An index of 105 is known to those of ordinary skill in the art as reacting at least 1.05 equivalents of (a) (isocyanate groups) with one equivalent of (b) (active hydrogen containing components). If the polyol or aminic polyol component (a) (ii) in any of the preceding formulas is greater than 0 parts by weight, an isocyanate quasi prepolymer is prepared by reacting the (a) ingredients at a temperature between 60°–300° F. for 2–3 hours.

With reference to the drawings, wherein like numerals refer to like parts in each of the several views, a method of adhesion of in situ vehicle bed liners is shown generally at FIGS. 1–5. In a preferred embodiment, shown in FIGS. 1–2, the vehicle bed 10 in which the liner 12 is to be created is preferably fitted with a retainer strip 14 at the rear edge 16 of the bed floor 18 and the rear edge 20 of each of the side walls 22 of the vehicle bed 10. The retainer strip 14 prevents loss of the applied polymer from the vehicle bed 10 during application of the liquid polymer and allows for production of a tapered liner floor 18 and molded sides 22.

The vehicle bed 10 in which the liner 12 is to be produced is preferably prepared by priming the surface. By priming the surface, a rust barrier is provided that prevents the premature obsolescence of the vehicle bed 10 and/or bed liner 12. The edges are important to insure adhesion so it is an objective of the present invention to provide enhanced adhesion by using an ugly weld along the edge of the vehicle bed 10.

Figure 3A:
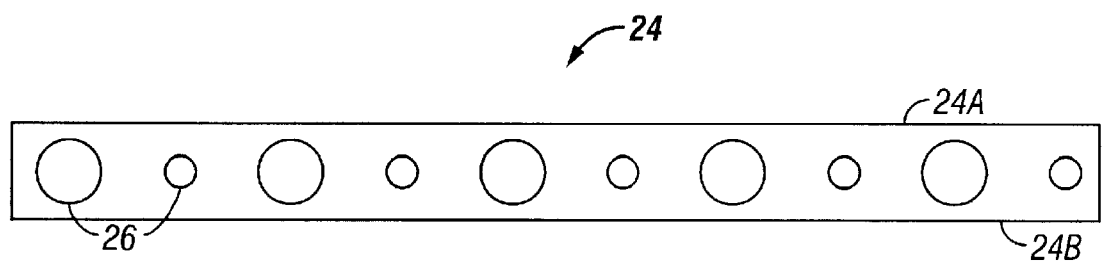
FIG. 3 is a perspective view of a strip in accordance with the present invention, showing the helical weld embodiment of the strip.
Figure 3B:
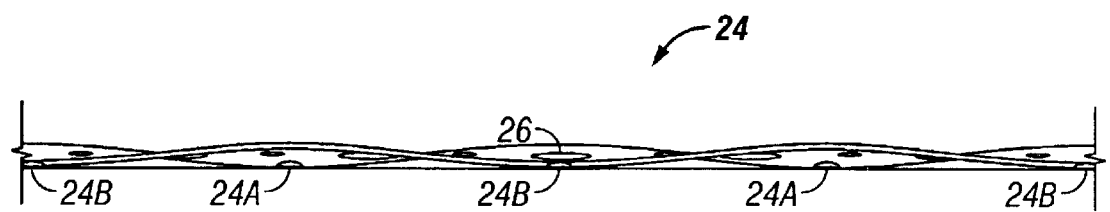

Focusing attention primarily to FIG. 3, strips 24, preferably made of a metal alloy, are provided which are welded to the floor 18 and sides 22 of the vehicle bed 10. It is preferable that the strips 24 have holes 26 through and around which the liquid polymer bed liner 12 may flow. The metal strips 24 are welded to the vehicle bed floor 18 and sidewalls 22 in predetermined patterns to enhance the ability of the liquid polymer bed liner 12 to adhere to the metal strips 24 and the vehicle bed 10 itself. In a preferred embodiment in accordance with the present invention, the strip 24 is longitudinally welded, to the vehicle bed 10, at alternating locations along the sides 24A and 24B of the strip 24, as shown in FIG. 3. The alternating sides 24A and 24B of the strip 24 that are not welded are raised such that the metal strip 24 forms a helix. The helix orientation provides an optimal groove for the liquid polymer bed liner 12 to flow through. Additionally, the holes 26 in the strip 24 allow for additional anchoring of the bed liner 12.

Figure 4:
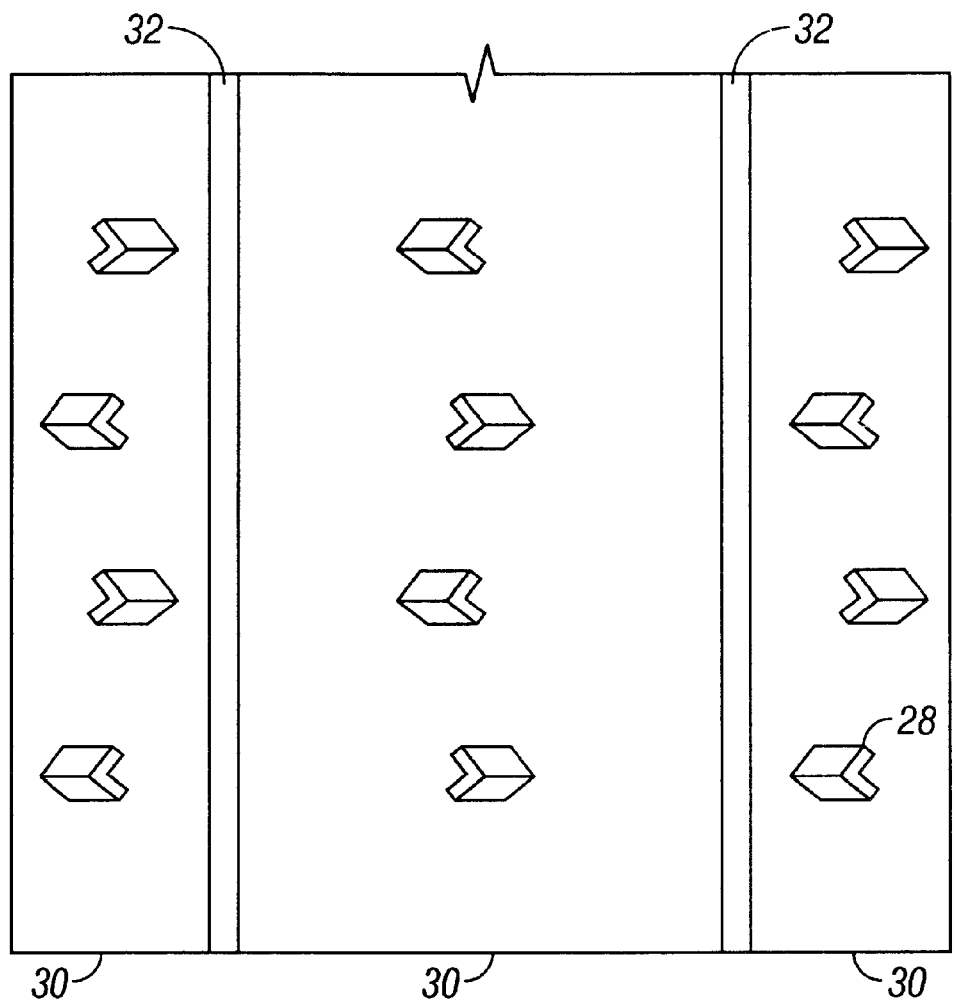
FIG. 4 is top view of the vehicle bed floor showing the "V" anchors.

Referring now to FIG. 4, additional reinforcement will be provided by smaller strips 28 that will be welded in the grooves 30 between the ribs 32 of the vehicle bed 10. These smaller strips 28 will be welded in a predetermined arrangement to serve as additional anchors for the bed liner 12. A preferred embodiment comprises upside down "V" shaped strips 28 welded to the floor of the vehicle bed 10.

The vehicle bed 10 is then leveled, and the front of the bed preferentially elevated several degrees to produce a tapered liner floor. The liquid polymer used to create the liner 12 is preferably a polymer system wherein the parts in liquid form are mixed together immediately prior to application to the vehicle bed 10. Upon mixing, the polymer composition reaches its gel point almost immediately. This allows the polymer to be applied to vertical surfaces of the vehicle bed 10 without significant amounts of sagging or running of the polymer composition that would impede smooth formation of the liner 12. The liquid polymer is poured in place and the gel point of the polymer is reached shortly after contact of the polymeric material with the vehicle bed 10.

Figure 5:
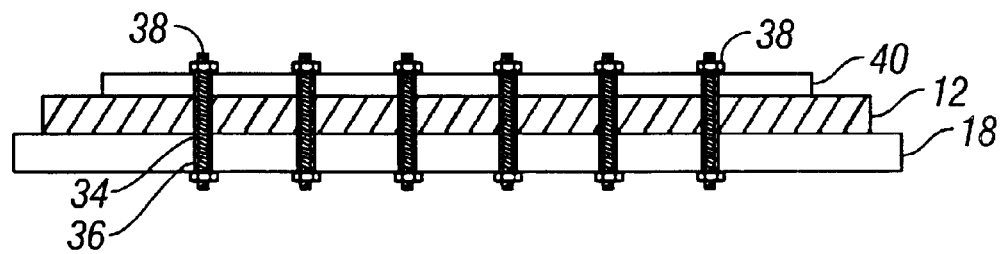
FIG. 5 is a sectional view of the bed liner bolted to the vehicle bed floor.

As an added adhesive measure, FIG. 5 shows the vehicle bed liner 12 may additionally be bolted to the vehicle bed 10 and/or sidewalls 22. In a preferred embodiment in accordance with the present invention, a strip 34, of metal or polymeric material, is passed through a hole 36 drilled through the vehicle bed liner 12 and the vehicle bed 10. The strip 34 is then bolted at both the end exposed on the bed liner 12 side and the end exposed underneath the vehicle bed floor 18. The sidewalls 22 may also be prepared in a similar manner. A metal strip 38 is disposed between the bolt 40 and the bed liner 12.

The features disclosed in the present description, example and claims, both separately and in combination thereof, are material for realizing this invention and diverse forms thereof. The invention is further illustrated by the following examples, which are not to be construed as limiting, but merely as an illustration of some preferred features of the invention.

An in situ vehicle bed liner of the present invention will be illustrated in the following example using a standard 17 foot dump truck box as a vehicle bed. However, it should be noted that the invention may be used on a wide variety of vehicle beds, including pick-up truck beds, industrial truck beds, asphalt haulers, tractor trailer floors and walls, horse and livestock trailers, cargo and delivery service vans, snowmobile and boat trailers, sewage vacuum trucks, fertilizer and chemical trucks, recycling collection trucks, waste disposal trucks and animal transport vans.

The in situ liner of the following example will cover the entire vehicle bed, including both sides and floor of the vehicle bed. However, an in situ liner could be created which covers only a portion of the vehicle bed, such as the floor. Such partial liners are within the scope of the present invention.

The liner of the present invention may also be used on non-vehicle bed surfaces, such as concrete pipes, chutes and manholes, street sweeper hoppers, sand and salt spreaders, manure spreaders, snowplow blades, loader buckets, industrial rigs and work surfaces, tank farm containment, boat docks, buoys, gravity boxes; hopper, coal, grain and box rail cars.

The polyurethane, polyurea or polyurethane/polyurea hybrid polymer used for creating the vehicle bed liner's vertical surfaces should be a polymer that reaches its gel point almost immediately upon application to the vehicle bed.

The inventors have surprisingly and unexpectedly found that by using polymers which reach their gel point immediately upon application, a contiguous bed liner that avoids sagging or running on vertical or highly inclined surfaces can be formed. The inventors have also discovered that by adding a thixotropic agent such as fumed silica or BYK-LP R 6237 (BYK chemie, Wallingford, Conn.) to such polymers will further prevent flowing or sagging of the polymer composition when applied to such surfaces.

The vehicle bed liner of the present invention is a polyurethane, polyurea or polyurethane/polyurea hybrid polymer.

Other materials may be added to the polymer liner composition, such as fillers, pigments, air release agents, internal lubricants and/or surfactants which can assist in increased tensile strength, tear strength, impact strength, hardness or decreased shrinkage, increased moisture and/or heat resistance, decreased flow, increased or decreased slip. Some fillers which may be employed are silica, silicates, graphite, molybdenum disulfide, carbons, silicones, Teflon.RTM., calcium carbonates, clays, aluminum oxides, magnesium oxides, iron oxides, titanium dioxides, and the like. Pigments may be added for coloring, hiding or UV inhibiting purposes.

A preferred polymer composition for use in the present invention is as follows:
(a) An isocyanate component comprising a 21% NCO Quasi Pre-Polymer prepared by mixing three to one a uretonimine modified 29% NCO MDI (Tedimon-316.TM., EniChem, Amsterdam, Netherlands) with a 4,800 MW polyether triol (glycerin starter) containing, with random distribution, 70% by weight ethylene oxide (EO) and 30% by weight propylene oxide (PO) (polyol TERCAPUR 1264, EniChem, Amsterdam, Netherlands); and (b) A polyol/amine component comprising:
  (i) 25 parts by weight dimethylthio toluene diamine, (ETHACURE-300, Albermarle Corporation, Baton Rouge, La.);
  (ii) 25 parts by weight 4,800 MW, EO capped polyether triol OH #35 (EO lower then 30% by weight) (Polyol T-555.TM., EniChem, Amsterdam, Netherlands)
  (iii) 50 parts by weight 4,800 MW, 70% (EO and 30% PO random polyether triol (Polyol T-1264.TM., EniChem, Amsterdam, Netherlands);
  (iv) 0.01 part by weight dibutyl tin dilaurate; and
  (v) 0.01 parts by weight triethylene diamine (DABCO 33LV, Air Products & Chemicals, Inc., Allantown, Pa.).

An in situ vehicle bed liner is prepared on a dump truck bed as follows.

Any bolted on hardware or other attachments on the bed of the dump truck which are not to be coated by the liner are removed. An edge is made on the end of the dump truck bed floor to contain the liquid polymer until it is gelled. Preferably this is done with an ⅛th inch thick angle iron retainer strip 14 having dimensions of ½" .times. ½ and a length equal to the inside measurement of the rear edge of the dump truck bed. This is welded to the rear edge of the dump truck bed 10. The angle iron is positioned approximately ⅛th inch forward from the rear edge of the dump truck box to allow for welding and tight fitting tailgates. The angle iron is solid welded across the full length of the rear edge of the angle iron relative to the front of the truck. The angle iron is then stitch welded along the full length of the front edge of the angel iron relative to the front of the truck.

Suitable protective materials such as masking paper and/or thin plastic such as polyethylene are placed on areas of the truck nearby or adjacent to the area wherein the polymer liner is to be formed. This is to protect those areas of the truck from undesired application of polymer composition or cleaning matter.

The surface of the dump truck bed to be coated with the polymer composition should have a clean, etched surface for good adhesion. This may be accomplished by priming using a quick set polyapoxyamide or other equivalent material. Priming prepares a surface by removing unwanted contaminants and putting microscratches and microdeformations in the surface of the vehicle bed. Priming also provides a rust barrier that resists corrosion. After priming, the abrasive material is removed from the dump truck bed, preferably with high pressure air and mechanical means such as by broom.

The dump truck should be leveled from side to side as shown in FIG. 1, and slightly inclined from front to back. To level the dump truck from side to side, a four foot or longer level is placed parallel to the rear edge of the truck bed and the truck positioned so that the bubble in the level is centered. The dump truck bed is then slightly inclined by placing a four foot or longer level parallel to the sides of the dump truck bed, and using the hydraulic system to operate the dump feature of the dump truck bed to slightly raise the front end of the dump truck bed a few degrees to the high side of the bubble within the level. By creating an inclined vehicle bed surface, a tapered liner floor is produced whereby the thickness of the liner at the rear of the vehicle will be greater than in the front. The portion of the liner floor at the rear of the vehicle undergoes the most wear and stress; therefore, it is helpful to produce a tapered liner having a thicker rear segment. The floor of the finished liner may range in depth from about ⅛" at the front edge of the liner to about 1" at the rear edge. The preferred range is from about ¼ at the front of the liner to about ½" at the rear edge.

To create the proper angle of the vehicle bed on vehicles lacking hydraulic lifts, blocks may be placed under the front wheels of the vehicle if a tapered liner floor is desired. The edges are important to insure adhesion so it is an objective of the present invention to provide enhanced adhesion by using an ugly weld along the edge of the vehicle bed.

In a preferred embodiment of the present invention, strips, preferably made of a metal alloy, are provided which are welded to the floor and sides of the vehicle bed. It is preferable that the strips have holes through and around which the liquid polymer bed liner may flow. The metal strips are welded to the vehicle bed and sidewalls in predetermined patterns to enhance the ability of the liquid polymer bed liner to adhere to the metal strips and the vehicle bed itself. In a preferred embodiment in accordance with the present invention, the strip is longitudinally welded, to the vehicle bed, at alternating locations along the sides of the strip. The alternating sides of the strip that are not welded are raised such that the metal strip forms a helix. The helix orientation provides an optimal groove for the liquid polymer bed liner to flow through. Additionally, the holes in the strip allow for additional anchoring of the bed liner.

Additional reinforcement will be provided by smaller strips that will be welded in the grooves between the ribs of the vehicle bed. These smaller strips will be welded in a predetermined arrangement to serve as additional anchors for the bed liner. A preferred embodiment comprises upside down "V" shaped strips welded to the floor of the vehicle bed.

One of the pumps of the plural component proportioner (Gusmer.RTM. VH-3000 Plural Component High Pressure Metering Unit from Gusmer, Lakewood, N.J.) is placed into the isocyanate component and the other into the polyol/amine component of the polymer composition. The chemicals are then heated to between about 70° F. and 200° F., preferably between about 100° F. and 150° F.

Each of the polymer components are poured in place in the vehicle bed. The mixed polymer reaches its gel point almost immediately upon contact with the sides of the dump truck bed. The sides of the vehicle bed liner are poured also in a manner to produce a contiguous coating of the polymer composition along the entire sides and front of the dump truck bed. The sides are allowed to gel, and further layers of the polymer composition may be applied to the sides of the dump truck bed as previously described until the vehicle bed liner is the desired thickness range of about ⅛" to about ½", preferably about ¼". It has been surprisingly and unexpectedly discovered by the inventors that by pouring the floor of the liner rather than spraying the liner, a more durable structure can be created. This additional strength is very important in the parts of the vehicle bed liner, such as the floor, which will be subject to the most amount of abrasion and high temperature.

If a mixer is utilized, it should have a mixing element diameter of from about 0.187 inches to 0.500 inches, preferably from 0.370 inches to 0.500 inches. The mixer should contain from 8 to 40 elements, preferably 36 to 40. Using the dispense gun, the floor of the in situ liner is poured using a proportioning pressure of between about 50 and 2000 psi, preferably between 250 and 900 psi. The material is poured starting in the front corners of the vehicle bed and pouring slowly from side to side, ensuring that each new pass of poured material flows quickly to meet the last material which has been poured, approximately 4–5 inches apart. This pour pattern is continued until the end of the dump bed is reached. A scaffold may be used for finishing the rear of the vehicle. To help in pouring a vehicle bed floor of consistent thickness, usually about ¼ inch to about ½ inch, a marker of the desired thickness can be placed on the surface beforehand. The marker should be made from a cured sample of the material being applied.

Once the surface is tack-free, additional layers of the polymer composition may be applied until the desired thickness is reached. If desired, the surface of the vehicle bed liner may be abraded or etched to provide additional traction to the surface after the liner surface becomes tack-free but prior to hardening. If necessary, the liner may be trimmed with a utility knife once the liner is tack-free. Finally, any hardware or attachments that have been removed from the vehicle box may be re-attached. In addition, as an added adhesive measure, the vehicle bed liner may be bolted to the vehicle bed and/or sidewalls. In a preferred embodiment in accordance with the present invention, a strip, of metal or polymeric material, is passed through a hole drilled through the vehicle bed liner and the vehicle bed. The strip is then bolted at both the end exposed on the bed liner side and the end exposed underneath the vehicle bed floor. The sidewalls may also be prepared in a similar manner.

The vehicle bed liner cures at ambient temperature. The liner is functional within hours, but reaches its maximum properties after 24–72 hours. The finished liner may be repaired and/or renewed anytime after usage has begun, by spraying or pouring additional polymer composition into the area(s) where wearing of the polymer liner has occurred.

Alternatively, an in situ vehicle bed liner that covers only the floor of the vehicle bed may be prepared by placing suitable protective materials on the sides of the vehicle bed and pouring only the floor of the vehicle liner in the manner previously described. It is understood that this invention is not confined to the particular embodiments herein illustrated and described, but embraces all such modified forms thereof as come within the scope of the following claims.

The present invention may be embodied in other specific forms without departing from its spirit or its central characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embrace within their scope.

What is claimed is:

1. A method of adhesion of an in situ vehicle bed liner comprising the steps of:
   (a) providing a polymer composition;
   (b) providing a vehicle bed having sides and a floor, the floor having a proximate first edge and a distal second edge;
   (c) welding at least one strip to the floor to interact with the polymer composition and the vehicle bed;
   (d) applying the composition directly to the sides of the vehicle bed to form a liner;
   (d) pouring the composition directly onto the floor of the vehicle bed creating a floor layer of the vehicle bed liner which is tapered and has a predetermined minimum thickness at the first edge of the floor of the vehicle bed and a predetermined minimum thickness at the second edge of the floor of the vehicle bed, the composition further flowing around the at least one strip; and
   (c) curing the liner on the vehicle bed wherein the composition cures around the at least one strip thereby providing enhanced adhesion of the vehicle bed liner to the vehicle bed, wherein the at least one strip has at least one aperture through which polymer composition flows.

2. A method of adhesion of an in situ vehicle bed liner comprising the steps of:
   (a) providing a polymer composition;
   (b) providing a vehicle bed having sides and a floor, the floor having a proximate first edge and a distal second edge;
   (c) welding at least one strip to the floor to interact with the polymer composition and the vehicle bed;
   (d) applying the composition directly to the sides of the vehicle bed to form a liner;
   (e) pouring the composition directly onto the floor of the vehicle bed creating a floor layer of the vehicle bed liner which is tapered and has a predetermined minimum thickness at the first edge of the floor of the vehicle bed and a predetermined minimum thickness at the second edge of the floor of the vehicle bed;
   (f) curing the liner on the vehicle bed;
   (g) wherein the at least one strip has at least one aperture therethrough; and
   (h) wherein the strip is welded such that the strip forms a helix.

3. A method of adhesion of an in situ vehicle bed liner comprising the steps of:
   (a) providing a polymer composition;
   (b) providing a vehicle bed having sides and a floor, the floor having a proximate first edge and a distal second edge and ribs extending between the proximate and the distal edges;
   (c) priming the vehicle bed to provide a rust barrier between the polymer composition and the vehicle bed.
   (d) providing a metal strip adapted to interact with the polymer composition and the vehicle bed;
   (e) providing at least one iron angle welded to the floor of the vehicle bed in between the ribs in the vehicle bed:
   (f) applying the composition directly to the sides of the vehicle bed to form a liner;
   (g) pouring the composition directly onto the floor of the vehicle bed creating a floor layer of the vehicle bed liner which is tapered and has a predetermined minimum thickness at the first edge of the floor of the vehicle bed and a predetermined minimum thickness at the second edge of the floor of the vehicle bed;
   (h) providing a strip having a first and a second end, the strip being passed through the polymer composition and the vehicle bed, and the strip being fastened to the polymer composition at the first end and the vehicle bed at the second end; and
   (i) curing the liner on the vehicle bed;
   wherein the polymer composition flows through the apertures and around the strips and iron angle to enhance the adhesion of the bed liner to the vehicle bed.

4. The method of claim 3, wherein the method further comprises providing a retainer strip at the rear edge of the floor of the vehicle bed and the rear edge of each of the side walls of the vehicle bed to prevent loss of the applied polymer from the vehicle bed during application of the liquid polymer composition and allows for production of a tapered bed liner floor and molded side walls.

5. A method of adhesion of an in situ vehicle bed liner comprising the steps of:
   (a) providing a polymer composition;
   (b) providing a vehicle bed having sides and a floor, the floor having a proximate first edge and a distal second edge;
   (c) priming the vehicle bed to provide a rust barrier between the polymer composition and the vehicle bed.
   (d) attaching to the vehicle bed at least one metal strip having apertures along its length, the metal strip adapted to interact with the polymer composition and the vehicle bed;
   (e) attaching an angle iron to the vehicle bed to function as a retainer strip;
   (f) applying the composition directly to the sides of the vehicle bed to form a liner;
   (g) pouring the composition directly onto the floor of the vehicle bed creating a floor layer of the vehicle bed liner which is tapered and has a predetermined minimum thickness at the first edge of the floor of the vehicle bed and a predetermined minimum thickness at the second edge of the floor of the vehicle bed;
   (h) curing the liner on the vehicle bed wherein the polymer composition flows through the apertures in the at least one metal strip to enhance the adhesion of the bed liner to the vehicle bed.

6. A method of adhesion of an in situ vehicle bed liner comprising the steps of:
   (a) providing a polymer composition;
   (b) providing a vehicle bed having sides and a floor, the floor having a proximate first edge and a distal second edge;
   (c) welding at least one strip to the floor to interact with the polymer composition and the vehicle bed;
   (d) applying the composition directly to the sides of the vehicle bed to form a liner;
   (e) pouring the composition directly onto the floor of the vehicle bed creating a floor layer of the vehicle bed liner which is tapered and has a predetermined minimum thickness at the first edge of the floor of the vehicle bed and a predetermined minimum thickness at the second edge of the floor of the vehicle bed; and
   (f) curing the liner on the vehicle bed; and
   wherein steps (c) and (d) further comprise:
      (i) pouring the composition onto the sides of the vehicle bed to form a continuous side layer of the composition on the sides of the vehicle bed;
      (ii) allowing the continuous side layer to gel;
      (iii) repeating steps (i) and (ii) until the sides of the vehicle bed liner have been formed;
      (iv) pouring the composition onto the floor of the vehicle bed to form a continuous floor layer of the composition on the floor of the vehicle bed which is contiguous with the side layer;
      (v) allowing the continuous floor layer to gel;
      (vi) repeating steps (iv) and (v) until the vehicle bed liner has been formed.

7. The method of adhesion of an in situ vehicle bed liner, comprising the steps of:
   (a) providing a polymer composition;
   (b) providing a vehicle bed having sides and a floor the floor having a proximate first edge and a distal second edge.
   (c) applying the composition directly on the floor of the vehicle bed to form a liner;
   (d) pouring the composition directly onto the floor of the vehicle bed creating a floor layer of the vehicle bed liner which is tapered and has a minimum thickness of one eighth inch at the first edge of the floor of the vehicle bed and a minimum thickness of one half inch at the second edge of the floor of the vehicle bed;
   (e) providing a strip having a first and a second end, the strip being passed through the polymer composition and the vehicle bed, and the strip being fastened to the polymer composition at the first end and the vehicle bed at the second end; and
   (f) curing the liner on the vehicle bed; and
   wherein steps (c) and (d) further comprise:
      (i) pouring the composition onto the sides of the vehicle bed to form a continuous side layer of the composition on the sides of the vehicle bed;
      (ii) allowing the continuous side layer to gel;
      (iii) repeating steps (i) and (ii) until the sides of the vehicle bed liner have been formed;
      (iv) pouring the composition onto the floor of the vehicle bed to form a continuous floor layer of the composition on the floor of the vehicle bed which is contiguous with the side layer;
      (v) allowing the continuous floor layer to gel;
      (vi) repeating steps (iv) and (v) until the vehicle bed liner has been formed.

8. A method of adhesion of an in situ vehicle bed liner, comprising the steps of:
   (a) providing a polymer composition comprising:
      (i) an isocyanate component, the isocyanate component comprising:
         (A) 70–100 parts by weight methylene-4,4'-diphenyl diisocyanate; and
         (B) 0–30 parts by weight of a component selected from the group consisting of polyol and aminic-polyol, with the excess in isocyanate groups ranging from 5% to 32.5%;
      (ii) a polyol/amine component, the polyol/amine component comprising:
         (A) 1–99 parts by weight of a polyether polyol component of functionality of 2 to 4 and an average molecular weight of 400–6,000;
         (B) 0–60 parts by weight fatty acid saturated polyester;
         (C) at least one amine component, selected from the group consisting of 1–99 parts by weight aromatic diamine, 1–99 parts by weight aliphatic amine, and 1–99 parts by weight any combination thereof;
         (D) 0–60 parts by weight aminic polyol;
         (E) 0–5 parts by weight of an organometallic urethane forming catalyst;
         (F) 0–5 parts by weight of an amine urethane forming catalyst; and
         (G) 0–40 parts by weight of an amine additive compound selected from the group consisting of triethanol amine and a triethanol amine-polyalkylene oxide reaction product;
   (b) providing a vehicle bed having sides and a floor, the floor having a proximate first edge and a distal second edge;
   (c) preparing the vehicle bed by priming the bed to form a rust barrier between the polymer material and the vehicle bed;
   (d) cleaning the vehicle bed;
   (e) attaching at least one strip having a first end and a second end to the floor, wherein at least the first end is attached by welding;

(f) pouring the composition onto the sides of the vehicle bed to form a continuous side layer of the composition on the sides of the vehicle bed;

(g) allowing the continuous side layer to gel;

(h) repeating steps (f) and (g) until the sides of the vehicle bed liner have been formed;

(i) pouring the composition onto the floor of the vehicle bed to form a continuous floor layer of the composition on the floor of the vehicle bed which is contiguous with the side layer;

(j) allowing the continuous floor layer to gel;

(k) repeating steps (i) and (j) until the vehicle bed liner has been formed, such that the floor layer is tapered and has a minimum thickness of one eighth inch at the first edge of the floor of the vehicle bed and a minimum thickness of one half inch at the second edge of the floor of the vehicle bed; and (l) curing the liner on the vehicle bed at a temperature between about 50 degrees Fahrenheit to about 110 degrees Fahrenheit.

9. A method of adhesion of an in situ vehicle bed liner comprising the steps of:

(a) providing a vehicle bed having sides and a floor, the floor having a proximate first edge and a distal second edge;

(b) attaching at least one helix-shaped strip to the floor;

(c) applying a polymer composition directly to the sides of the vehicle bed to form the walls of a liner;

(d) pouring the composition directly onto the floor of the vehicle bed to permit the composition to interact with the helix-shaped strip and the vehicle bed, creating a floor layer of the vehicle bed liner; and (e) curing the composition on the vehicle bed and the strip.

10. A method of adhesion of an in situ vehicle bed liner comprising the steps of:

(a) providing a vehicle bed having sides and a floor, the floor having a proximate first edge and a distal second edge;

(b) attaching at least one helix-shaped strip to the floor, the strip having a first and a second end, the strip being fastened to the vehicle bed at least at one end;

(c) applying a polymer composition directly to the sides of the vehicle bed, creating the walls of a liner;

(d) pouring a polymer composition directly onto the floor of the vehicle bed and the strip, whereby the strip interacts with the polymer composition and the vehicle bed, creating a floor layer of the vehicle bed liner; and (e) curing the polymer composition.

* * * * *